June 2, 1953  R. A. KENNEDY  2,640,727
BALANCING WEIGHT
Filed Feb. 1, 1950
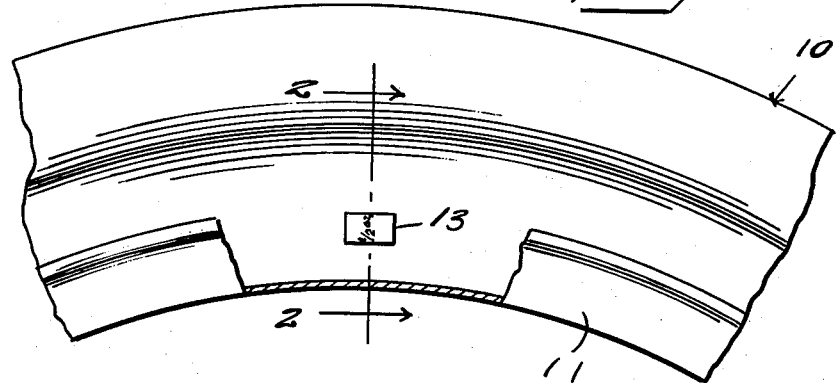
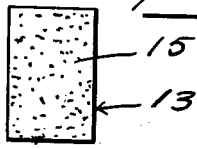
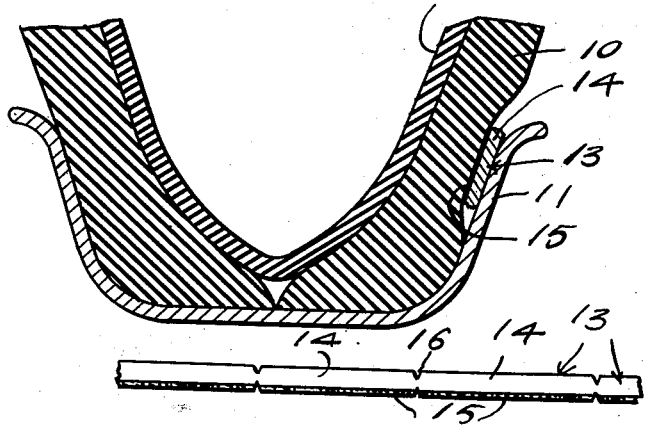
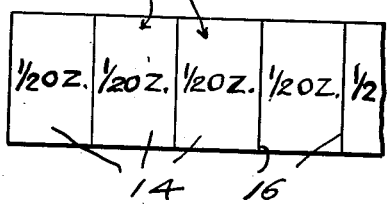
INVENTOR
R. A. Kennedy
BY
Kimmel & Crowell ATTORNEYS Patented June 2, 1953

2,640,727

UNITED STATES PATENT OFFICE 2,640,727

BALANCING WEIGHT

Raymond A. Kennedy, Sioux City, Iowa

Application February 1, 1950, Serial No. 141,758

1 Claim. (Cl. 301—5)

This invention relates to a balancing weight and, more particularly, to a weight adapted to balance a rotatable wheel or a tire therefor, particularly as applied to the wheels of motor vehicles or the landing wheels of airplanes.

A primary object of the invention is the provision of an improved weight adapted to be permanently fixed to a tire casing for balancing the weight of the tire to insure even rotation.

A further object of the invention resides in the provision of such a weight which may be affixed to a tire casing in such manner as permanently to retain its position even when the tire is removed from the vehicle wheel for service or repair or other purposes.

Still another object of the invention is the provision of such a balancing weight which may be fixed to the tire casing in such position as to be out of sight as well as out of any possible contact with the road surface, thus to insure preclusion of the possibility of disengagement or displacement thereof.

A still further object of the invention is the provision of such a weight adapted to be supplied in strip form, the strip containing a quantity of readily separable equal weights together with a means for applying them to the tire casing in a compact, convenient, and unitary strip form.

Still another object of the invention resides in the provision of such a structure which is simple and inexpensive to manufacture, reliable and efficient in operation, compact and simple of installation.

Still other objects reside in the combination of elements, arrangement of parts, and features of construction, all as will be more fully pointed out hereinafter and shown in the accompanying drawing wherein there is disclosed a preferred embodiment of this inventive concept.

In the drawing:

Figure 1 is a fragmentary side elevational view, partially sectioned, of a tire and wheel rim therefor, showing the device of the instant invention as applied to the casing of the tire.

Figure 2 is an enlarged fragmentary sectional view taken substantially on the line 2—2 of Figure 1 as viewed in the direction indicated by the arrows.

Figure 3 is a bottom plan view of one of the tire balancing weights.

Figure 4 is a top plan view of a strip of the weights in assembled relation, and Figure 5 is an enlarged side elevational view of a fragment of the strip shown in Figure 4.

Similar reference characters refer to similar parts throughout the several views of the drawing.

Referring now to the drawing in detail, there is best shown in Figures 1 and 2 a vehicle tire 10 such as the tire of an automobile or an airplane landing wheel adapted to be seated in conventional manner in a corresponding rim 11 and provided with the conventional inner tube 12. The tire balancing weight of the instant invention generally indicated at 13 is preferably comprised of a metal weight 14 to the under side of which is affixed a layer of adhesive 15, which may be comprised of rubber cement or the like, permitting permanent attachment of the weight to the side wall of the casing in the position indicated between the tire and the rim. The upper side of the weight 13 may carry indicia indicating the weight thereof as disclosed in Figures 1 and 4.

While in the preferred embodiment of this invention the weight is described as being comprised of a suitable metal having a layer of rubber cement or other suitable adhesive affixed to one side thereof, it may be pointed out that any other desired material may be utilized; for example, the weight may be comprised solely of rubber, or metallized rubber, or rubber mixed with metal granules, or with powdered metal, or, if desired, a suitable plastic such as a phenolic resin or any other suitable material of the desired weight. Obviously the dimensions are immaterial but should be kept sufficiently small to fit entirely between the side wall of the rim and the tire casing.

A preferred weight for the balancing weights may be one-half an ounce. Modern machine practices have reduced unbalance in wheel structures to substantially zero proportions while due to the elasticity and other qualities of rubber, unbalance may and sometimes does, exist in tires, but is usually in so minor a degree that a weight of half an ounce, or, if necessary, suitable multiples thereof, is sufficient to correct the same.

In the distribution of these weights they are preferably furnished in strip form as disclosed in Figures 4 and 5, suitable indentations 16 being formed between adjacent half ounce weights in such manner that they may be readily separated merely by the use of the fingers.

It will thus be seen that there is herein provided a construction which accomplishes all the objects of this invention, and others, including many advantages of great practical utility and commercial importance.

As many embodiments may be made of this

I claim:

In combination with a vehicle wheel having a rim and spaced side flanges on said rim, a tire casing seated on said rim, said casing having side walls extending between said flanges, a rubber body intermixed with powdered metal and including a permanently attached layer of rubber cement on one side thereof, said cement affixing said body to a side wall of said tire casing between said side wall and a flange of said rim in such manner as to make said body a permanent part of said tire.

RAYMOND A. KENNEDY.

References Cited in the file of this patent

UNITED STATES PATENTS

| Number | Name | Date |
| --- | --- | --- |
| 447,136 | Mott | Feb. 24, 1891 |
| 1,692,145 | Woolson | Nov. 20, 1928 |
| 2,122,064 | Hume | June 28, 1938 |
| 2,171,438 | Tarbox | Aug. 29, 1939 |
| 2,195,473 | Von Brethorst | Apr. 2, 1940 |
| 2,245,355 | Mullen | June 10, 1941 |
| 2,339,718 | Periat | Jan. 18, 1944 |